United States Patent [19]

Ikeda

[11] Patent Number: 5,949,923
[45] Date of Patent: Sep. 7, 1999

[54] IMAGE READER

[75] Inventor: Hidetoshi Ikeda, Dazaifu, Japan

[73] Assignee: Matsushita Electric Industrial Co., Ltd., Osaka, Japan

[21] Appl. No.: 08/740,086

[22] Filed: Oct. 24, 1996

[30] Foreign Application Priority Data

Oct. 26, 1995 [JP] Japan ..................................... 7-278791

[51] Int. Cl.⁶ ............................... G06K 9/32; H04N 5/44; H04N 9/74; H04N 1/393
[52] U.S. Cl. ........................ 382/298; 382/296; 382/299; 348/561; 348/581; 348/704; 358/451; 364/715.07
[58] Field of Search .................................. 382/274, 298, 382/299, 296; 358/448, 451, 462; 348/561, 581, 704; 364/715.07

[56] References Cited

U.S. PATENT DOCUMENTS

| | | | |
|---|---|---|---|
| 4,827,433 | 5/1989 | Kamon | 382/299 |
| 4,878,126 | 10/1989 | Ichikawa | 358/451 |
| 5,001,768 | 3/1991 | Mita et al. | 382/274 |
| 5,036,545 | 7/1991 | Iida et al. | 382/274 |
| 5,191,623 | 3/1993 | Moriya | 382/298 |
| 5,424,852 | 6/1995 | Funada | 358/448 |
| 5,465,166 | 11/1995 | Kamo | 358/451 |
| 5,465,305 | 11/1995 | Ueno | 382/218 |
| 5,608,541 | 3/1997 | Yamada | 382/296 |

*Primary Examiner*—Phuoc Tran
*Assistant Examiner*—Daniel G. Mariam
*Attorney, Agent, or Firm*—Stevens, Davis, Miller & Mosher, L.L.P.

[57] ABSTRACT

In an image reader, a main scanning start point of a magnification-changing processing is stored in a main scanning start point register. An increment corresponding to a magnification-changing ratio is stored in an incremental register. A pixel number to be outputted as a magnification-changing output is stored in a multiple-changing output pixel number register. A pixel counter counts the number of pixels to be outputted as the magnification-changing output. An adder serially adds an increment to the main scanning start point and outputs it to a latch. A line memory stores original image data to be read, and the sum of the output value of the latch and +1 is given as a read address. A mean value arithmetic unit calculates a mean value of two adjacent pixels and outputs it as data after the magnification-changing processing.

1 Claim, 8 Drawing Sheets

IMAGE READER

BACKGROUND OF THE INVENTION

1. Field of the Invention

This invention relates to an image reader for optically reading original images.

2. Description of the Related Art

In image readers used for image scanners, facsimiles, copying machines, etc, it has become more and more popular to execute various image processings such as an image segmentation processing, an expansion/ reduction processing, a mirror inversion processing, a filter processing, a lightness/contrast correction processing, and so forth, for read image data, instead of using the image data as they are read out, and to utilize the image data after such image processings are executed.

As resolution of the image readers has become higher in recent years, however, the quantity of the data handled has become greater, and the problem has arisen in that the processing speed drops in those methods which process software-wise these image data.

To cope with this problem, a method has been employed which disposes an exclusive processing circuit dedicated to the image processing inside the image reader and accomplishes a high speed processing.

Hereinafter, an example of the conventional image readers will be explained with reference to the drawings.

FIG. 8 is a block diagram of the image reader according to the prior art.

A CCD (charge coupled device) image sensor 1 (hereinafter referred to as the "image sensor") photographs an object and outputs an image signal. An amplifier 2 amplifies the image signal outputted from the image sensor 1. An A/D converter 3 converts the image signal outputted from the amplifier 2 from an analog signal to a digital signal, and outputs the image signal as the digital image data. An image processing unit 4 executes image processings such as a shading processing, an MTF (modulation transfer function) correction, a main scanning direction magnification-changing processing, etc. A buffer memory 5 temporarily stores the image data. An interface unit 6 exchanges the image data with an external appliance (not shown). A timing generation circuit 7 controls the operations of the image sensor 1, the amplifier 2, the A/D converter 3, the image processing unit 4, the buffer memory 5 and the interface unit 6. A CPU (central processing unit) 8 controls the image reader as a whole. A ROM (read-only memory) 9 for CPU stores a control program for controlling the operation of the CPU 8. A RAM (random access memory) 10 is used as a work area of the CPU 8.

FIG. 9 is a block diagram showing the construction of the image processing unit 4 of the image reader shown in FIG. 8. As shown in FIG. 9, the image processing unit 4 comprises a shading processing unit 41, a main scanning direction magnification-changing processing unit 42, a moire removing processing unit 43, a mirror inversion processing unit 44, a segmentation processing unit 45, an MTF correction processing unit 46 and a binarization processing unit 47.

Next, the image processing function of the image reader shown in FIGS. 8 and 9 will be explained briefly.

To begin with, the shading processing unit 41 normalizes non-uniformity of illumination of a light source and variance of the sensitivity of the image sensor 1. The main scanning direction magnification-changing processing unit 42 executes enlargement/ reduction processing of the original image in a main scanning direction. The moire removing processing unit 43 reduces the influences of the moire resulting from the main scanning direction magnification-changing processing. The mirror inversion processing unit 44 outputs the image whose right and left sides are inverted to those of the original image. The segmentation processing unit 45 selects and outputs only a designated range with respect to the main scanning direction of the original image. The MTF correction processing unit 46 increases or decreases sharpness of the image. The binarization processing unit 47 converts multi-value image data to binary value data by a designated system such as simple binarization, dithering, an error diffusion processing, or the like. These image processing functions can be selectively turned ON and OFF on the basis of the data read mode designation from a host computer, etc.

To execute the image processing functions described above, at least one line of buffer memory is necessary for each function. In the image processing unit 4 shown in FIG. 9, a buffer memory 5 disposed for buffering the data input/ output in the interface with the host computer serves also as the buffer memory for executing these image processings.

FIG. 10 is a block diagram showing another example of the construction of the image processing unit 4. In this structural example, dedicated memories 51 to 57 are disposed for the shading processing unit 41, the main scanning direction magnification-changing processing unit 42, the moire removing processing unit 43, the mirror inversion processing unit 44, the segmentation processing unit 45, the MTF correction processing unit 46 and the binarization processing unit 47, respectively, and in the image processing unit 4 shown in FIG. 10, too, the image processing functions similar to those of the image processing unit 4 shown in FIG. 9 are accomplished.

The buffer memory 5 of the image processing unit 4 shown in FIG. 9 is originally disposed so as to play the role of a buffer in the interface with the host computer, and the buffer memory necessary for executing each image processing of each of the processing units ranging from the shading processing unit 41 to the binarization processing unit 47 is executed also by this buffer memory 5. In consequence, the number (capacity) of the memories can be minimized, and an economical image reader can be acquired.

However, because the access to the buffer memory 5 frequently occurs, a problem exists in that the processing quantity of the data per unit time (output throughput) drops significantly.

In the image processing unit 4 shown in FIG. 10, on the other hand, the dedicated memories 51 to 57 are disposed for the processing units 41 to 47, respectively. Therefore, output through-put of the data can be increased, it is true, but another problem occurs that the memory cost increases.

It is therefore an object of the present invention to provide an image reader which can execute a plurality of image processings by a smaller memory capacity but has a high data output through-put.

An image reader according to the present invention includes storage means for storing original image data to be read and read means for reading out the original image data stored in the storage means in accordance with a designated magnification-changing ratio and with a segmentation area.

Because the original image data stored in the storage means are read out in accordance with the magnification ratio and with the segmentation area, the magnification-changing processing and segmentation processing of the original image data can be collectively carried out.

Therefore, the present invention can provide an image reader capable of executing a plurality of image processings by a smaller memory capacity and having a high data output through-put.

SUMMARY OF THE INVENTION

An image reader according to the first invention includes storage means for storing original image data to be read and read means for reading out the original image data stored in the storage means in accordance with a designated magnification-changing ratio and with a segmentation area.

The image reader according to the first invention can read out the original image data stored in the storage means in accordance with the magnification-changing ratio and with the segmentation area, can execute the magnification-changing processing of the original image data and can also execute the segmentation processing of the original image data. Because the magnification-changing processing and the segmentation processing can be collectively executed in one data flow, the number of line memories necessary exclusively for the processings can be reduced without lowering output through-put, and the cost of the circuit can be reduced, too. Because the circuit construction can be simplified, the circuit scale becomes smaller, and its cost can be reduced.

An image reader according to the second invention employs the construction wherein the read means in the image reader of the first invention includes first latch means for latching the start point of the magnification-changing processing of the read original image data, second latch means for latching an increment value in accordance with the magnification-changing ratio, third latch means for latching the data number to be outputted as a magnification-changing output, address generation means for generating a read address of the storage means by serially, i.e., iteratively adding the increment value latched by the second latch means to the start point latched by the first latch means, counting means for counting the number of data read out from the storage means, and stop means for stopping the output of the original image data read out from the storage means when the number of the data read out by the counting means coincides with the number of the data latched by the third latch means.

The image reader according to the second invention can execute the magnification-changing processing of the original image data at an arbitrary magnification-changing ratio by setting the increment value latched by the second latch means to an arbitrary value. This image reader can segment an arbitrary image data among the original image data stored in the storage means by setting the start point latched by the first latch means and the number of the data latched by the third latch means to arbitrary values.

An image reader according to the third invention employs the construction wherein the second latch means in the construction of the image reader according to the second invention latches a complement value of 2 of the increment value in accordance with the magnification-changing ratio. According to this construction, the magnification-changing processing and the segmentation processing can be executed while the mirror inversion processing of the original image data is executed.

An image reader according to the fourth invention employs the construction wherein mean value arithmetic unit for calculating a mean value of a plurality of adjacent pixels of the original image data read out from the storage means is further provided to the construction of the image reader according to any of the first, second and third inventions. According to this construction, the influences of the moire when the magnification-changing ratio is small can be optimally removed.

An image reader according to the fifth invention employs the construction wherein interpolation value arithmetic unit for calculating an interpolation value of a plurality of adjacent pixels of the original image data read out from the storage means is further provided to the construction of the image reader according to any of the first, second, third and fourth invention. According to this construction, the influences of the moire can be optimally removed when the magnification-changing ratio is great.

DESCRIPTION OF THE PREFERRED EMBODIMENTS

The first embodiment of the present invention will be explained hereinafter with reference to the drawings.

Figure 1:
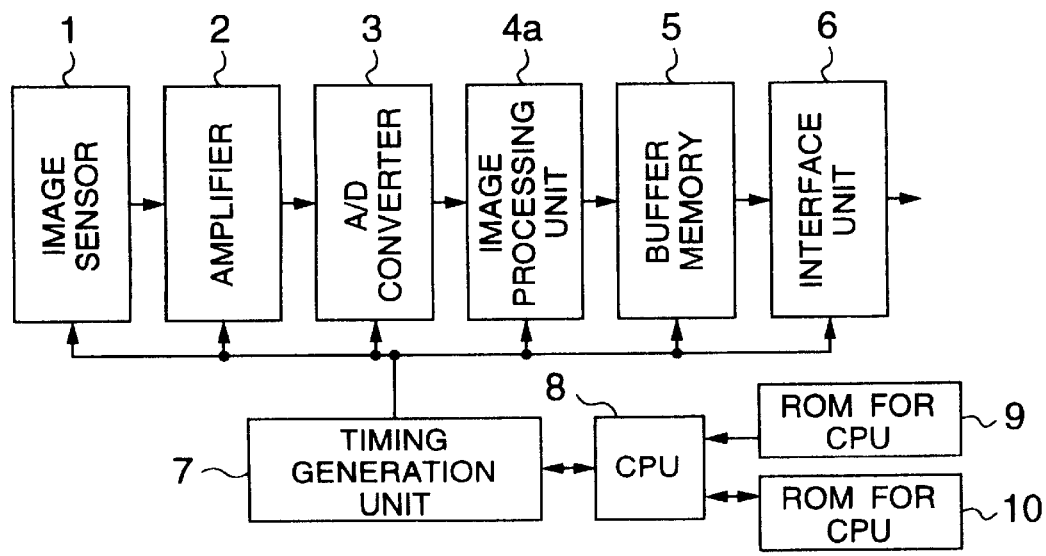
FIG. 1 is a block diagram of an image reader according to the first embodiment of the present invention.
Figure 8:
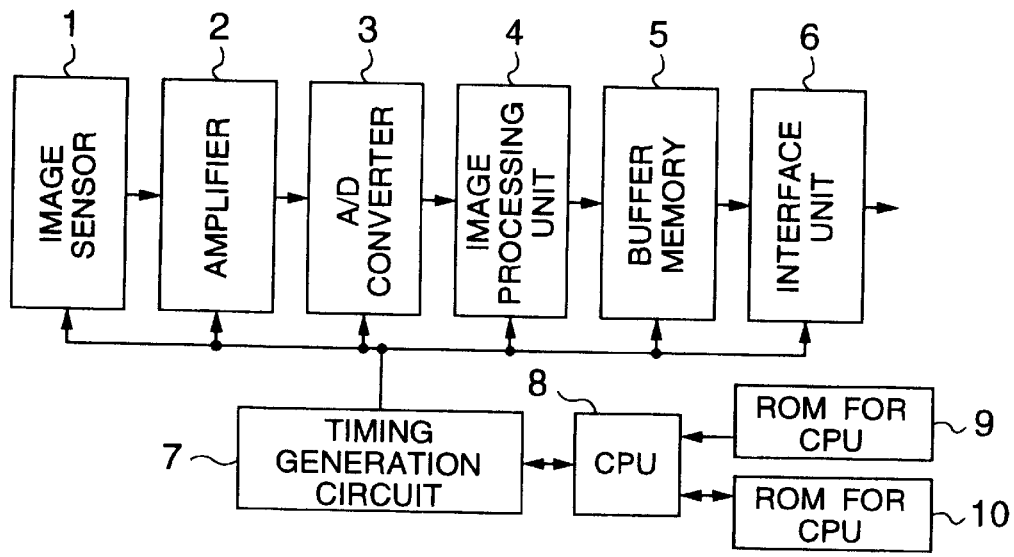
FIG. 8 is a block diagram of an image reader according to the prior art.

FIG. 1 is a block diagram of an image reader according to the first embodiment of the present invention. The difference of the image reader according to the present invention shown in FIG. 1 from the image reader according to the prior art shown in FIG. 8 resides in that an image processing unit 4a having a different internal construction is disposed in place of an image processing unit 4. Since the rest of the construction is the same as that of the image reader shown in FIG. 9, the explanation of the overlapping portions will be omitted.

Figure 2:
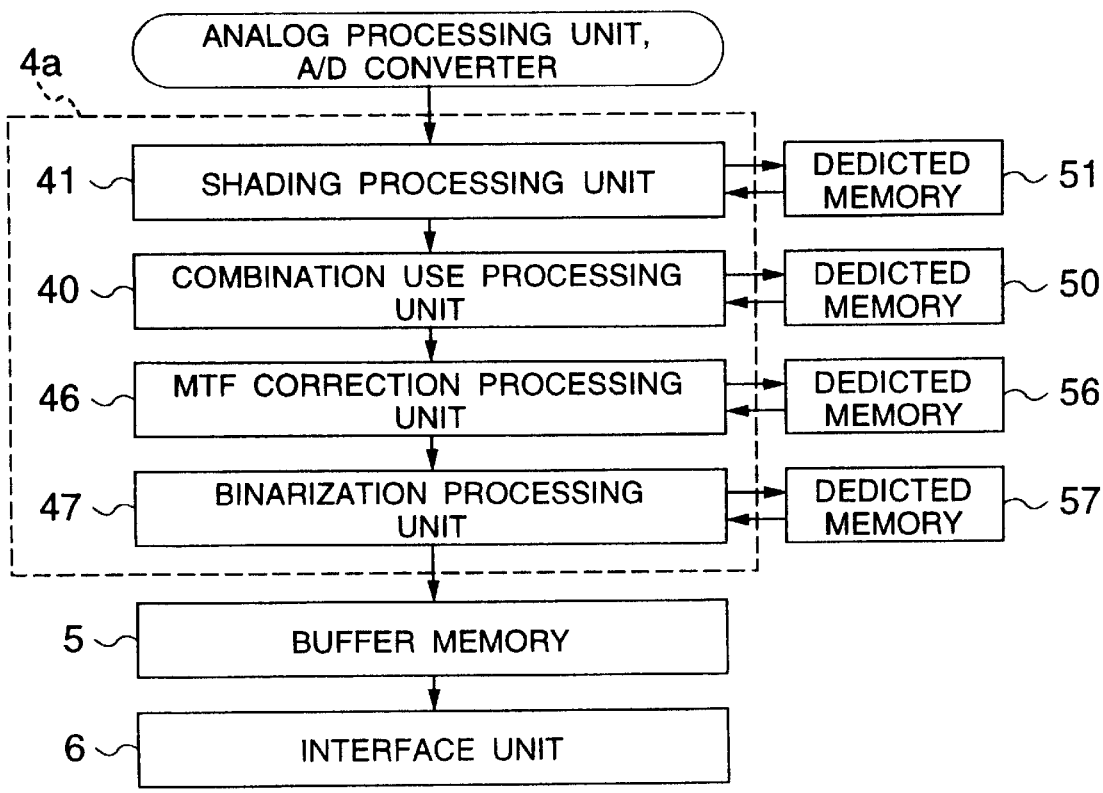
FIG. 2 is a block diagram of an image processing unit in the image reader according to the first embodiment of the present invention.

FIG. 2 is a block diagram showing the construction of the image processing unit 4a in the image reader shown in FIG. 1.

The image processing unit 4a includes a shading processing unit 41, a combination use processing unit 40, an MTF correction processing unit 46 and a binarization processing unit 47 as shown in FIG. 2.

Figure 9:
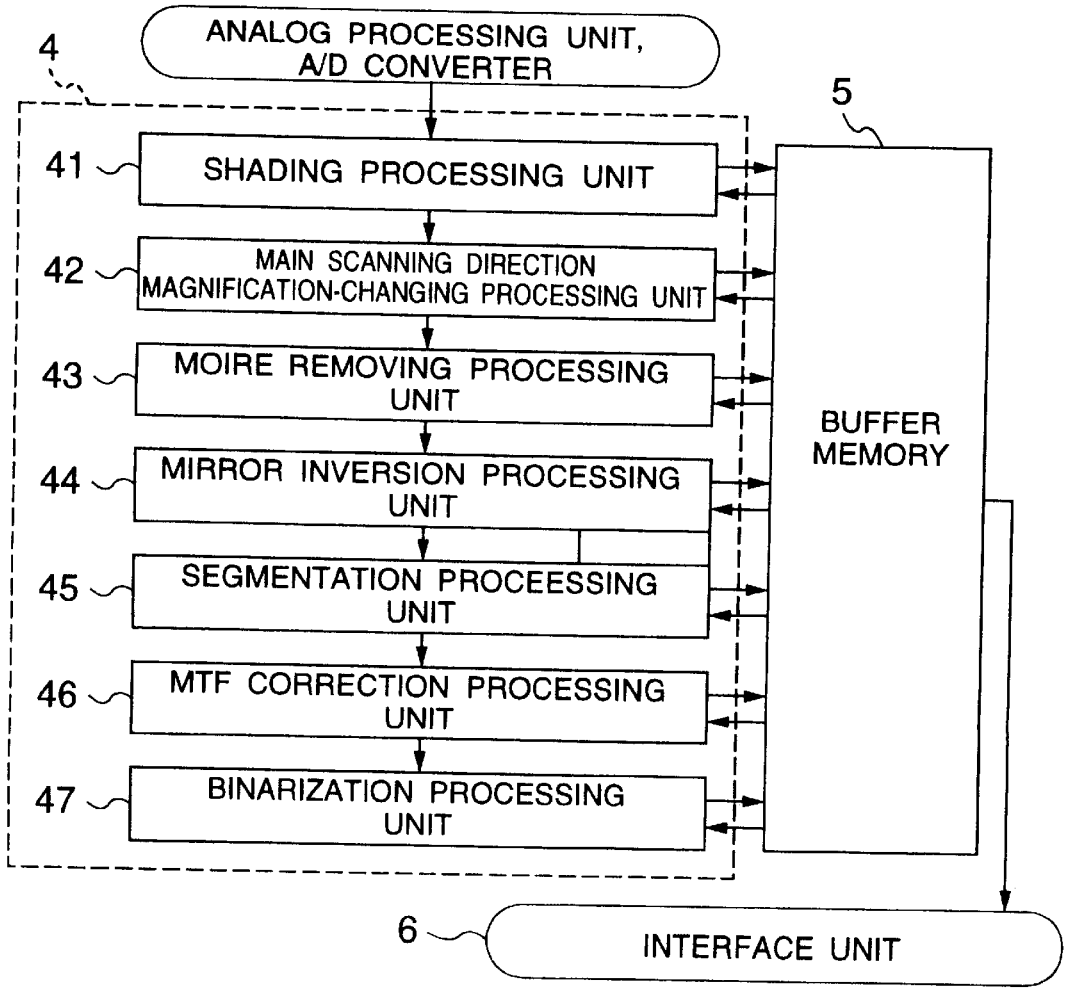
FIG. 9 is a block diagram of an image processing unit of the image reader according to the prior art.
Figure 10:
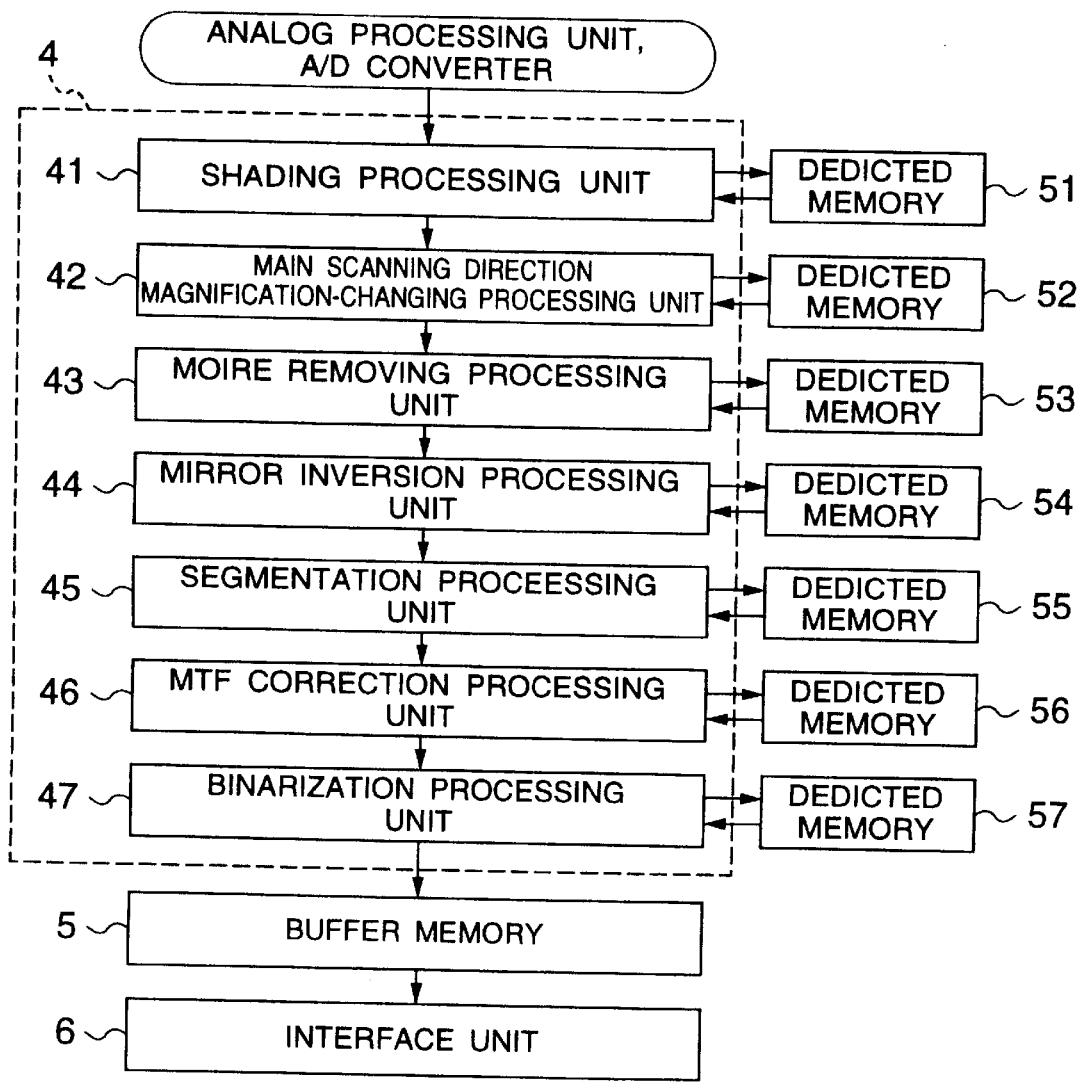
FIG. 10 is a block diagram showing another example of the image processing unit of the image reader according to the prior art.

The combination use processing unit 40 has the functions of executing, in one data flow, the main scanning direction magnification-changing processing, the moire removing processing, the mirror inversion processing and the segmentation processing that are executed by the main scanning direction magnification-changing processing unit 42, the moire removing processing unit 43, the mirror inversion processing unit 44 and the segmentation processing unit 45 of the prior art example shown in FIG. 9, respectively.

A dedicated memory 51, 50, 56, 57 is provided to each of the shading processing unit, the combination use processing unit 40, the MTF correction processing unit 46 and the binarization processing unit 47, respectively.

Figure 3:
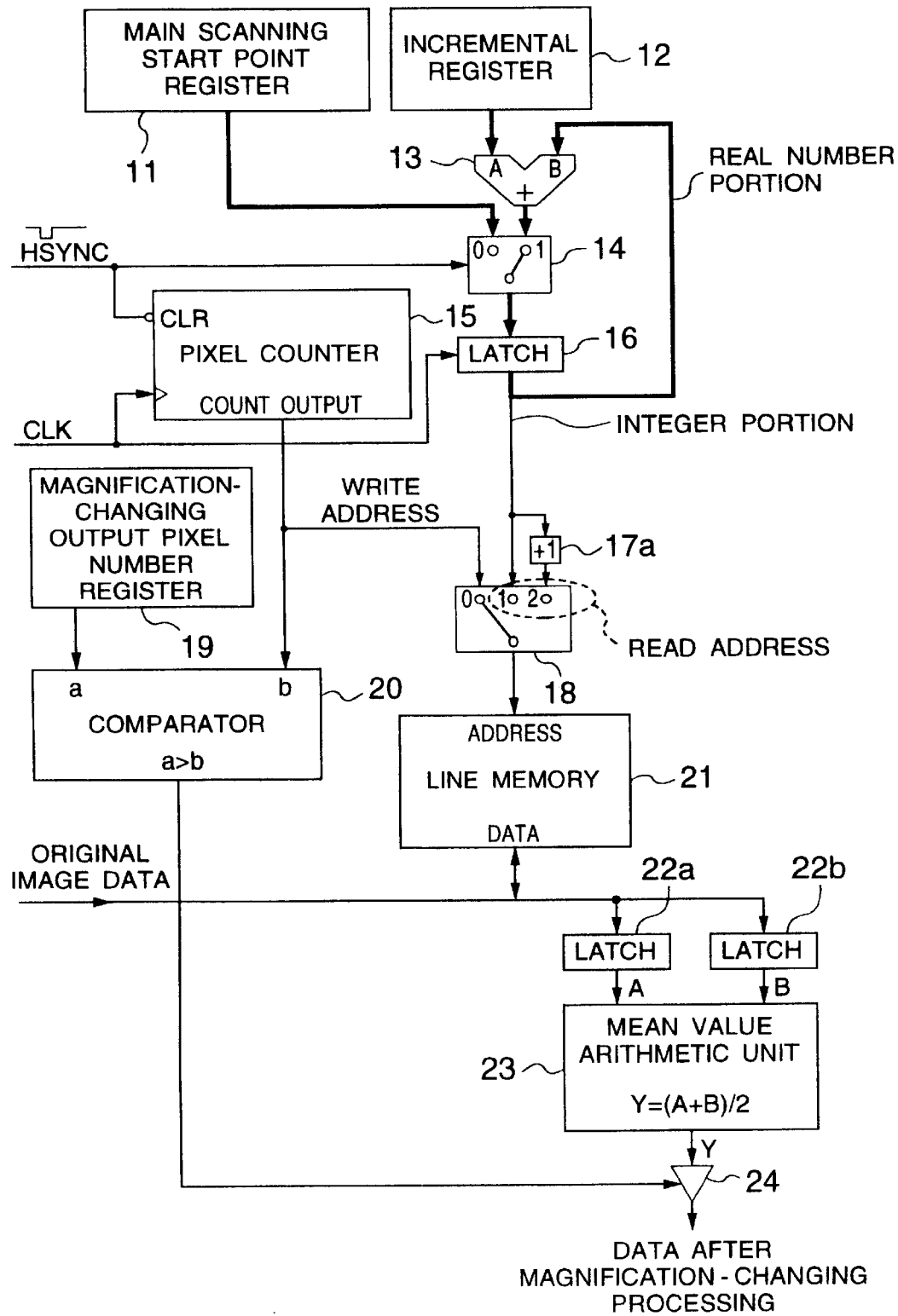
FIG. 3 is a block diagram showing the construction of a combination use processing unit of the image reader according to the first embodiment of the present invention.

FIG. 3 is a block diagram showing a detailed circuit construction of the combination use processing unit 40 shown in FIG. 2. Next, this construction will be described briefly.

Referring to FIG. 3, a main scanning start point register 11 stores a main scanning start point of the magnification-changing processing. An increment representing to which times resolution should be set in the magnification-changing processing is set and stored in an incremental register 12. An adder 13 adds the increment stored in the incremental register 12 and a magnification-changing processing object line value stored in a latch 16, which will be described later, and outputs the addition result. A selector 14 receives an HSYNC signal (horizontal synchronization signal) and selectively outputs one of the output of the main scanning start point register 11 and the output of the adder 13. The latch 16 latches the value outputted from the selector 14 and feeds back the real number portion of the output value to the adder 13. A +1 adder 17a adds +1 to the value outputted from the latch 16.

A pixel counter 15 generates a storage address of original image data for the magnification-changing processing and counts the number of magnification-changing output pixels. When the output of the pixel counter 15 is given as a write address, an address selector 18 first connects a 0-th tap and then connects serially a first tap and a second tap. The output of the latch 16 is applied to the first tap, and the output of the +1 adder 17a, which is the sum of the output of the latch 16 and +1, is applied to the second tap. These two values are outputted as the output to the line memory 21.

The line memory 21 stores the two addresses outputted by the address selector 18 and the original image data for the magnification-changing processing, that correspond to these addresses. A latch 22a stores the original image data corresponding to the address data obtained when the address selector 18 selects the first tap. A latch 22b stores the original image data corresponding to the address data obtained when the address selector 18 selects the second tap.

A mean value arithmetic unit 23 calculates a mean value of the data value latched by the latch 22a and the data value latched by the latch 22b. A gate 24 outputs the calculation result of the mean value arithmetic unit 23.

On the other hand, a magnification-changing output pixel number register 19 stores a magnification-changing output pixel number. A comparator 20 compares the output of the magnification-changing output pixel number register 19 with the output of the pixel counter 15, and controls the operation of the gate 24 in accordance with the comparison result.

In this embodiment, the line memory 21 constitutes the storage means, and the main scanning start point register 11, the incremental register 12, the adder 13, the selector 14, the latch 16, the +1 adder 17a and the address selector 18 constitute the read means. The main scanning start point register 11 constitutes the first latch means, the incremental register 12 constitutes the second latch means, and the magnification-changing output pixel number register 19 constitutes the third latch means. Further, the pixel counter 15 constitutes the counting means, the adder 13, the selector 14, the latch 16 and the +1 adder 17a constitute the address generation means, and the comparator 20 and the gate 24 constitute the stop means. The latches 22a and 22b and the mean value arithmetic unit 23 constitutes the mean value calculation means.

Next, how the magnification-changing processing, the moire removing processing, the mirror inversion processing and the segmentation processing in the combination use processing unit 40 shown in FIG. 2 are executed by using the construction shown in FIG. 3 will be explained in detail.

To begin with, the operation of storing the original image data as the source data of the magnification-changing processing in the line memory 21 will be explained. As the signal HSYNC falls to the low level immediately before the leading pixel of the original image data for one line is inputted, the value of the pixel counter 15 is cleared to 0 (zero).

A clock signal clk is inputted to the pixel counter 15, and the pixel counter 15 is incremented one by one in synchronism with the rise of the clock signal clk. At the same time, the address selector 18 is connected to the 0-th tap for a predetermined period within one cycle of the clock signal clk. In consequence, the output of the pixel counter 15 is given as the write address to the line memory 21 through the 0-th tap of the address selector 18. Further, a write pulse (not shown) is inputted to the line memory 21. Accordingly, the original image data are serially stored from the 0-th address of the line memory 21.

Figure 4:
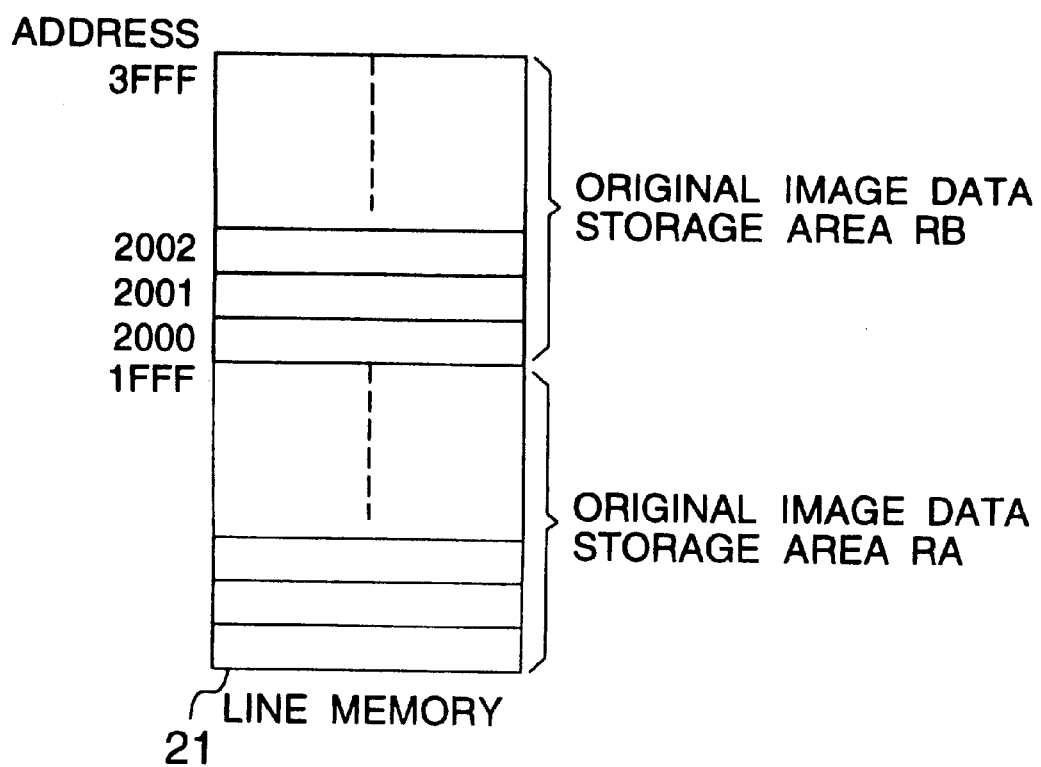
FIG. 4 is a view showing a memory map of a line memory used for the combination use processing unit of the image reader according to the first embodiment of the present invention.

FIG. 4 shows a memory map of the line memory 21. Two original image data storage areas RA and RB exist in the line memory 21 as shown in FIG. 4. When the original image data of the n-th line are stored in the original image data storage area RA, the original image data of the (n+1)-th line are stored in the original image data storage area RB, and the original image data of the (n+2)-th line are similarly stored in the original image data storage area RA. In this way, the original image data are stored serially and alternately for each read line in the original image data storage areas RA and RB. This operation can be accomplished by alternately switching the most significant address of the line memory 21 to "0" and "1" for each read line.

When the original image data of the (n+1)-th line are being stored in the original image data storage area RB at present, the magnification-changing processing is executed for the original image data of the n-th line that have already been stored in the original image data storage area RA. Here, the following operation condition is set for the purpose of explanation.

First, the leading pixel is regarded as the 100-th pixel, and magnification-changing outputs are generated for 300 pixels. It is assumed in this instance that read resolution is 600 dpi and this resolution is subjected to magnification-changing processing to 250 dpi (reduction). It is assumed further that the mirror inversion processing is not executed.

These conditions are set to the main scanning start point register 11, the incremental register 12 and the magnification-changing output pixel number register 19, respectively. In other words, 100 representing the leading pixel is set to the main scanning start point register 11, the quotient 600/250=2.4 obtained by dividing read resolution of 600 dpi by resolution of 250 dpi after magnification-changing is set to the incremental register 12, and 300 is set to the magnification-changing output pixel number register 19. In this way, the magnification-changing processing described above can be executed. This operation will be next explained in detail.

Referring to FIG. 3, if the signal HSYNC falls to the low level before the leading pixel for one line of the original image data is executed, the value of the pixel counter 15 is cleared to "0", the selector 14 is set to the 0-th tap and the value 100 of the main scanning start point register 11 is latched by the latch 16 (initial value input).

Thereafter, when the address selector 18 is serially switched to the first tap and the second tap, the output (=100) of the latch 16 and the integer portion of the output (=101) of the +1 adder 17a become the read address. The line memory 21 stores the image data corresponding to two continuous address data 100 and 101 that are outputted by the address selector 18. The original image data of the 100-th address and the original image data of the 101-th address of the line memory 21 are taken out from the latch 22a and the latch 22b. The values of these latches 22a and 22b are averaged by the mean value arithmetic unit 23 and are outputted as the leading data after the magnification-changing processing from the gate 24. Since the magnification-changing output pixel number register 19 stores the data representing that the magnification-changing processing is made for only the 300 pixels, the comparator 20 allows the gate 24 to execute the processing until the count output outputted from the pixel counter 15 exceeds 300.

When the signal HSYNC returns to the high level before the rise of the next clock signal clk and the selector 14 is set to the first tap, the output value of the adder 13 is given to the latch 16. Since the adder 13 outputs the addition result of the output value (=100) of the latch 16 and the output value (=2.4) of the incremental register 12, its output value becomes as follows:

$$100 + 2.4 = 102.4$$

When the next clock signal clk rises and is inputted to the latch, the output value of the latch 16 becomes 102.4, and only its integer portion becomes the read address of the line memory 21. Accordingly, the original image data of the 102-th address of the line memory 21 and the original image data of the 103-th address are taken out from the latch 22a and the latch 22b. The values of these latches 22a and 22b are averaged by the mean value arithmetic unit 23, and is outputted as the second data after the magnification-changing processing from the gate 24.

Similarly, the addresses of the line memory 21 storing the original image data are serially decided by the integer portions of the sums of the output of the latch 16 and the value of the incremental register 12 (=2.4), and the mean value of the two adjacent pixels is outputted as the data after the magnification-changing processing.

When the number of the data after the magnification-changing processing exceeds 300, the value of the pixel counter 15 becomes greater than the value (=300) of the magnification-changing output pixel number register 19, and the condition of the comparator 20 (A>B) is no longer satisfied. As a result, the gate 24 stops its output, and the magnification-changing outputs are not generated for the data after the 301-th et seq.

To sum up the operations described above, the magnification-changing processing from a main scanning resolution of 600 dpi to a main scanning resolution of 250 dpi is conducted while the segmentation processing for the pixels of the 100-th to 300-th pixels of the original image data is being executed. Further, because the averaging operation of the two adjacent pixels is conducted, the moire removing processing is executed.

Next, the mirror inversion processing will be explained. To execute this mirror inversion processing, a negative value may be applied to the incremental register 12 shown in FIG. 3. In order to execute the mirror inversion processing while the magnification-changing processing is being carried out from 600 dpi to 250 dpi, therefore, a negative value –2.4 may be set to the incremental register 12. In practice, since the incremental register 2 holds the binary value, the value 2.4 can be expressed as "00000000000010.01100110" by the binary notation by assuming that the sign bit is 1, the integer portion has 13 digits and the decimal fraction has 8 digits. In other words, the complent value of 2, i.e. "11111111111101.10011010", is set.

Therefore, the output values of the adder 13 are subtracted 2.4 by 2.4, so that the address of the line memory 21 is likewise subtracted 2.4 by 2.4. In consequence, the data after the magnification-changing processing obtained from the mean value of the two adjacent pixels exhibits the mirror inversion to the original image data.

In the embodiment described above, the moire removing processing is carried out by conducting the averaging operation of the two adjacent pixels, and this method is effective when resolution after the magnification-changing processing is ½ to ¼ of read resolution. When resolution after the magnification-changing resolution is smaller than ¼, the moire removing effect becomes higher by conducting the averaging operation of four adjacent pixels. Next, the second embodiment for executing the averaging operation of the four adjacent pixels will be explained.

Figure 5:
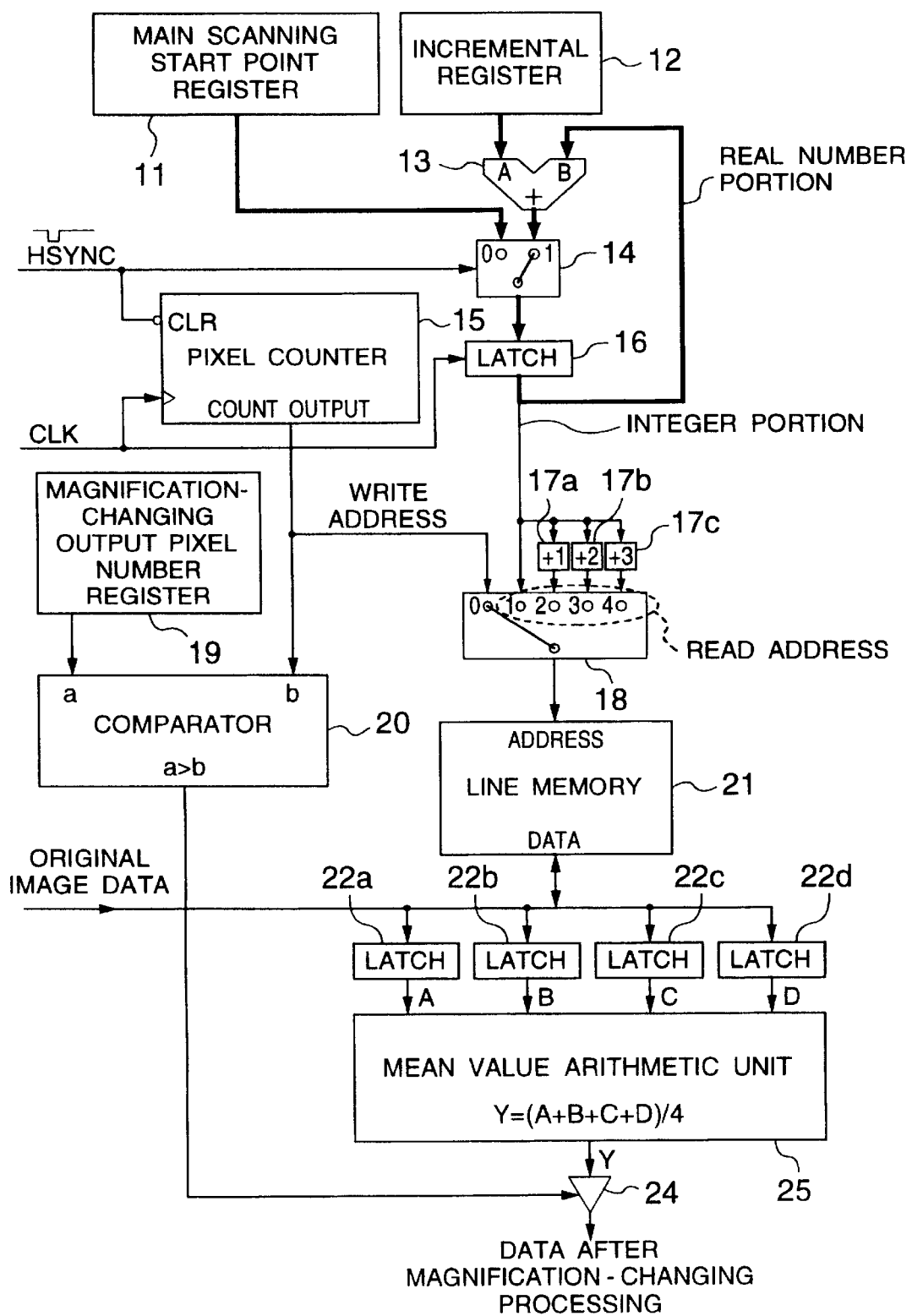
FIG. 5 is a block diagram showing the construction of a combination use processing unit of an image reader according to the second embodiment of the present invention.

FIG. 5 is a block diagram showing the construction of the combination use processing unit of the image reader according to the second embodiment of the present invention.

The difference of the combination use processing unit shown in FIG. 5 from the combination use processing unit shown in FIG. 3 is that a +2 adder 17b and a +3 adder 17c are disposed in place of the +1 adder 17a, two tops are added to the address selector 18 so as to cope with this change, latches 22c and 22d are disposed in addition to the latches 22a and 22b, and a mean value arithmetic unit 25 for computing the mean value of four adjacent pixels is disposed in place of the mean value arithmetic unit 23 for computing the mean value of the two adjacent pixels.

The +2 adder 17b adds +2 to the output value of the latch 16 and applies the sum to the third tap of the address selector 18. The +3 adder 17c adds +3 to the output value of the latch 16 and applies the sum to the fourth tap of the address selector 18. The line memory 21 stores the four addresses outputted from the address selector 18 and the image data corresponding to each address. These image data are serially stored in the latches 22a to 22d, and the mean value arithmetic unit 25 calculates the mean value of the image data latched by these latches 22a, 22b, 22c and 22d.

In this embodiment, the adder 13, the selector 14, the latch 16, the +1 adder 17a, the +2 adder 17b, the +3 adder 17c and the address selector 18 together constitute the address generation means, and the latches 22a, 22b, 22c and 22d and the mean value arithmetic unit 25 together constitute the mean value calculation means.

According to the combination use processing unit shown in FIG. 5, the image after the magnification-changing processing, which has less moire, can be obtained even when resolution after the magnification-changing processing is not greater than ¼.

Incidentally, the second embodiment contains one operation of writing the original image data to the line memory 21 and four times of operations of reading out the original image data from the line memory 21 to obtain the four adjacent pixels within one cycle of the clock signal clk. However, since the number of the magnification-changing output pixels is not greater than ¼ of the original image data, it is also possible to carry out once or twice the read operation within one cycle of the clock signal clk, to produce the magnification-changing output in every two or four cycles of the clock signal clk, and thus to decrease the number of times of access to the line memory 21.

In this second embodiment, the adders for generating the four adjacent pixels add (0), +1, +2 and +3 to the output value of the latch 16, but a construction which adds −1, (0), +1 and +2 to the output value of the latch 16 may be employed, as well.

In the second embodiment, a mean value arithmetic unit for calculating the mean value of eight adjacent pixels or a mean value arithmetic unit for calculating the mean value of sixteen adjacent pixels may be further disposed so as to optimize the moire removal with respect to a magnification-changing ratio of not greater than ⅛ or not greater than ¹⁄₁₆. The reason why the number of pixels for the mean arithmetic operation is the power of 2 is because the mean arithmetic operation can be made by only the addition and the shift calculation, and the mean arithmetic operation can be made for other numbers when a divider is used.

When resolution after the magnification-changing processing is greater than ½, the moire removal effect becomes higher if an interpolation operation of the two mean pixels is conducted. Next, the third embodiment for executing the interpolation operation of the two adjacent pixels will be explained.

Figure 6:
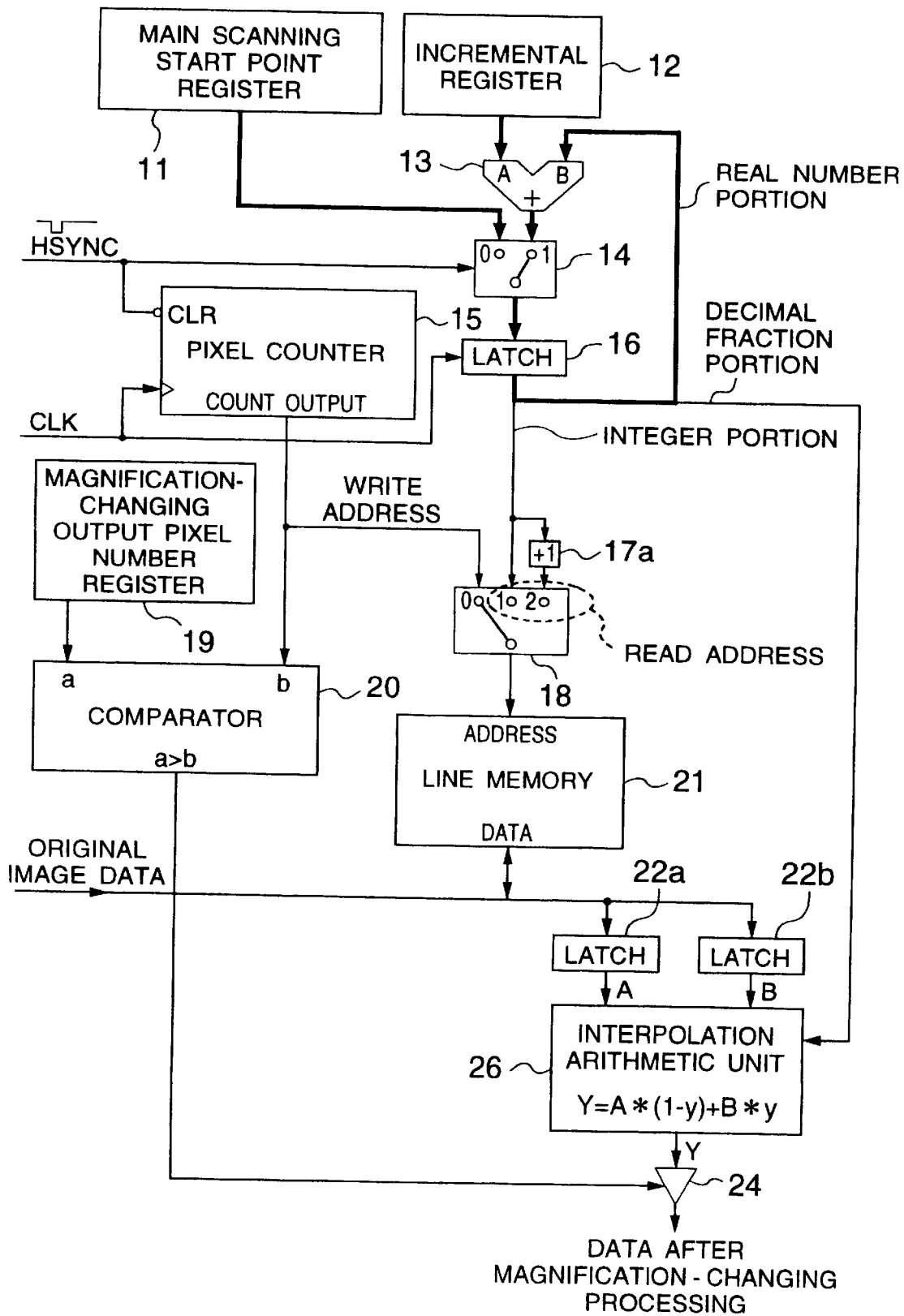
FIG. 6 is a block diagram showing the construction of a combination use processing unit of an image reader according to the third embodiment of the present invention.

FIG. 6 is a block diagram showing the construction of the combination processing unit of the image reader according to the third embodiment of the present invention.

The difference of the combination use processing unit shown in FIG. 6 from the combination use processing unit shown in FIG. 3 is that an interpolation arithmetic unit 26 for executing the interpolation operation of two adjacent pixels is disposed in place of the mean value arithmetic unit 23 for calculating the mean value of the two adjacent pixels, and the decimal fraction portion of the latch 16 is inputted as an interpolation coefficient to the interpolation arithmetic unit 26.

In this embodiment, the latches 22a and 22b and the interpolation arithmetic unit 26 together constitute interpolation value calculation means.

Here, the following operation condition is set for the purpose of explanation. It will be first assumed that read resolution is 600 dpi and this resolution is subjected to the magnification-changing (expansion). It will be assumed next that the leading pixel is the 100-th pixel and the magnification-changing outputs are produced for the 300 pixels. Furthermore, the mirror inversion processing is not assumed to be executed.

When these conditions are given the intended magnification-changing processing can be executed by setting 100 to the main scanning start point register 11, 600/800=0.75 to the incremental register 12 and 300 to the magnification-changing output pixel number register 19. This operation will be explained in detail next.

In FIG. 6, when the signal HSYNC falls to the low level before the processing, the value of the pixel counter 15 is cleared to 0, the selector 14 is set to the 0-th tap, and the value 100 of the main scanning start point register 11 is latched by the latch 16 (initial value input).

At this time, only the integer portion of the value stored is outputted from the latch 16, and when the address selector 18 is serially switched to the first tap and the second tap, the original output of the latch 16 and the output of the +1 adder 17a as the sum of +1 and the original output become the read addresses of the line memory 21. In other words, the original image data of the 100-th address of the line memory 21 and the original image data of the 101-th address are taken out for the latch 22a and the latch 22b. The image data of these latches 22a and 22b are interpolated by the interpolation arithmetic unit 26 and are outputted as the leading data after the magnification-changing processing from the gate 24. Since the decimal fraction portion y of the latch 16 is 0 in this instance, the value of the leading data after the magnification-changing processing is given by:

$$Y=A*(1-y)+B*y=A$$

where A is the value of the latch 22a and
B is the value of the latch 22b.

The signal HSYNC returns to the high level before the next clock signal clk rises, and the selector 14 is connected to the first tap. Therefore, the output value of the adder 13 is given to the latch 16. Because this adder 13 outputs the addition result of the output value (=100) of the latch 16 and the output value (=0.75) of the incremental register 12, its output value is 100+0.75=100.75.

When the next clock signal clk rises, the output value of the latch 16 is 100.75, and only its integer portion, that is, 100, becomes the read address of the line memory 21. Therefore, the original image data of the 100-th address of the line memory 21 and the original image data of the 101-th address are taken out for the latch 22a and the latch 22b. The original image data of these latches 22a and 22b are interpolated by the interpolation arithmetic unit 26 and are outputted as the second data after the magnification-changing processing. At this time, the decimal fraction portion of the value of the latch 16 is inputted as the y value to the interpolation arithmetic unit 26, and the data value after the magnification-changing processing becomes as follows:

$$Y=A*(1-y)+B*y=0.25A+0.75B$$

Thereafter, the addresses of the line memory 21 storing the original data are determined one after another by the integer portion of the sum of the output of the latch 16 and the value (=0.75) of the incremental register 12 and the interpolation coefficient y is determined one after another by the decimal fraction portion, and the interpolation value of the two adjacent pixels is outputted as the data after the magnification-changing processing.

When the number of the data after the magnification-changing processing exceeds 300, the value of the pixel counter 15 becomes greater than the value (=300) of the magnification-changing output pixel number register 19 and the condition (a>b) of the comparator 20 is no longer satisfied. Therefore, the gate 24 stops its outputting operation. As a result, the data after the 301-th et seq. are not outputted as the magnification-changing output.

The operations described above can be summarized as follows. While the original image data are being segmented from the 100-th data, the magnification-changing processing is made from a main scanning resolution of 600 dpi to a main scanning resolution of 800 dpi, and moire removal is conducted by executing the interpolation operation of the two adjacent pixels.

Figure 7:
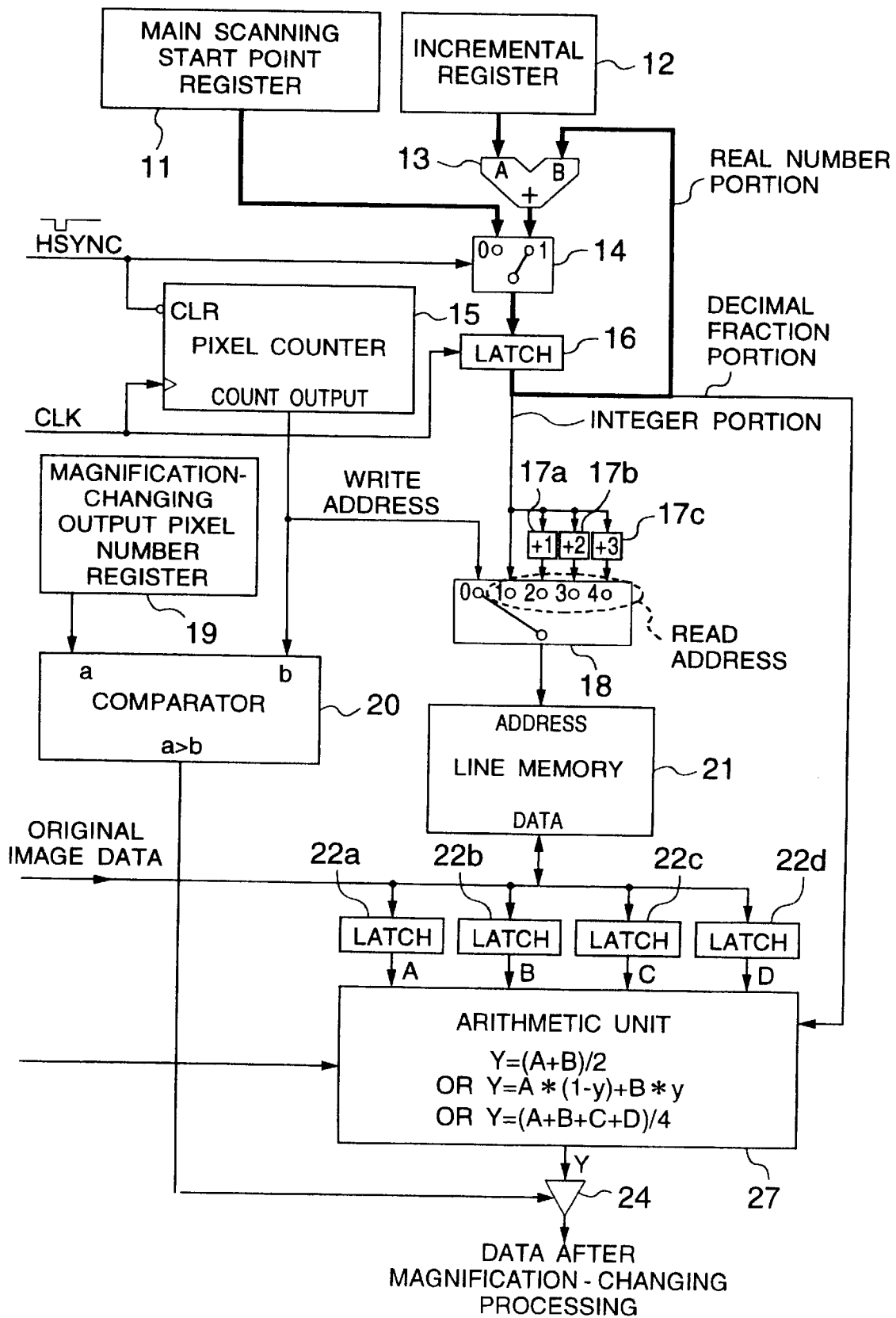
FIG. 7 is a block diagram showing the construction of a combination use processing unit of an image reader according to the fourth embodiment of the present invention.

FIG. 7 is a block diagram showing the construction of the combination use processing unit of the image reader according to the fourth embodiment of the present invention.

The combination use processing unit shown in FIG. 7 comprises the combination of the combination use processing units shown in FIGS. 3, 5 and 6, and is provided with an arithmetic unit 27 capable of selecting any of the averaging operation of the two adjacent pixels, the averaging operation of the four adjacent pixels and the interpolation operation of the two adjacent pixels. Therefore, optimum moire removal can executed in accordance with the magnification-changing ratio.

In this embodiment, the latches 22a, 22b, 22c and 22d and the arithmetic unit 27 constitute the mean value arithmetic unit and the interpolation arithmetic unit.

According to the first to fourth embodiments described above, the magnification-changing processing, the segmentation processing, the mirror inversion processing and the moire removing processing among the image processing functions can be collectively executed. Therefore, the number of the dedicated line memories necessary for the processings can be reduced without lowering the through-put and the circuit cost can be reduced, too. Further, since the circuit construction can be simplified, the circuit scale becomes smaller, and the production cost can be reduced. The influences of the moire can be optimally removed in accordance with the magnification-changing ratio, and a magnification-changing output image having high quality can be always obtained.

According to the first invention, the magnification-changing processing of the original image data and the segmentation processing can be collectively executed in accordance with the designated magnification-changing ratio and with the segmentation area. Therefore, the magnification-changing processing and the segmentation processing can be executed with a smaller memory capacity, and an image reader having a high output through-put of the data can be obtained.

According to the second invention, the magnification-changing processing at an arbitrary magnification-changing ratio can be executed by setting the increment value to an arbitrary value, and the segmentation processing of an arbitrary original image data can be executed by setting arbitrarily the start point and the data number.

According to the third invention, the magnification-changing processing and the segmentation processing of the original image data can be collectively executed while executing the mirror inversion processing of the original image data by setting the increment value to the complement of 2.

According to the fourth invention, the magnification-changing processing and the segmentation processing of the original image data can be collectively executed while removing optimally the influences of the moire when the magnification-changing ratio is small, by calculating the mean value of a plurality of adjacent pixels of the original image data.

According to the fifth invention, the magnification-changing processing and the segmentation processing can be collectively executed while removing optimally the influences of the moire when the magnification-changing ratio is great, by calculating the interpolation value of a plurality of adjacent pixels of the original image data.

What is claimed is:

1. An image reader comprising:
    original image data storage means for storing original image data to be read on a one line unit basis;
    line synchronization signal generating means for generating a timing signal indicative of one line unit;
    read means for reading the original image data stored in said original image data storage means in accordance with a magnification-changing ratio and a segmentation area;
    said read means including:
        first latch means for latching an address value indicative of a start point of a magnification-changing processing relative to said original image data storage means;
        magnification-changing start point setting means for setting the start point of the magnification-changing processing relative to said first latch means;
        second latch means for latching an increment value in accordance with the magnification-changing ratio;
        magnification-changing ratio setting means for setting an increment value in accordance with the magnification-changing ratio relative to said second latch means;
        third latch means for latching a data number to be output as a magnification-changing output;
        output data number setting means for setting an output data number relative to said third latch means;
        address generation means for sequentially generating an address read from said original image data storage means by sequentially adding the increment value latched by said second latch means relative to the magnification-changing start point address latched by said first latch means;
        counting means for counting the data number read from said original image data storage means;
        a value indicated by said address generation means being reset to a read start address in which the address read from said original image data storage means is stored in said first latch means by the synchronization signal generated in said line synchronization signal generating means, and an output value of said address generation means being sequentially changed with the increment value set by said second latch means;
        read stop means for stopping reading of the original image data read from said original image data storage means when a value counted by said count means coincides with a value latched by said third latch means;
        said magnification-changing ratio setting means permitting setting of a positive increment value corresponding to the magnification-changing ratio and a complement value of 2 of the increment value; and
        said second latch means including a number of bits sufficient to indicate a complement value of 2.

* * * * *